United States Patent
Adams et al.

(10) Patent No.: US 11,668,878 B2
(45) Date of Patent: Jun. 6, 2023

(54) FIBER-OPTIC SWITCHES USING MULTICORE OPTICAL FIBERS

(71) Applicant: VIAVI SOLUTIONS INC., San Jose, CA (US)

(72) Inventors: Robert Matthew Adams, Ottawa (CA); Joshua Benjamin Julius Philipson, Ottawa (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/187,348

(22) Filed: Feb. 26, 2021

(65) Prior Publication Data
US 2022/0276444 A1 Sep. 1, 2022

(51) Int. Cl.
*G02B 6/35* (2006.01)
*G02B 6/38* (2006.01)
*G02B 6/02* (2006.01)

(52) U.S. Cl.
CPC ........... *G02B 6/351* (2013.01); *G02B 6/3504* (2013.01); *G02B 6/3526* (2013.01); *G02B 6/3586* (2013.01); *G02B 6/02042* (2013.01); *G02B 6/3885* (2013.01)

(58) Field of Classification Search
None
See application file for complete search history.

(56) References Cited

U.S. PATENT DOCUMENTS

| | | | | |
|---|---|---|---|---|
| 6,453,084 | B1 * | 9/2002 | Stanford | G02B 6/3588 385/18 |
| 6,597,829 | B2 * | 7/2003 | Cormack | G02B 6/3524 385/15 |
| 6,636,653 | B2 * | 10/2003 | Miracky | G02B 6/32 385/14 |

(Continued)

FOREIGN PATENT DOCUMENTS

| AU | 2020100777 A4 * | 6/2020 |
|---|---|---|
| JP | 2-82212 A * | 3/1990 |

OTHER PUBLICATIONS

H. Mulvad et al. Beam-steering all-optical switch for multi-core fibers. Optical Fiber Communication Conference 2017, Paper Tu2C-4, Mar. 2017 (https://doi.org/10.1364/OFC.2017.Tu2C.4). (Year: 2017).*

(Continued)

*Primary Examiner* — Michael Stahl
(74) *Attorney, Agent, or Firm* — Mannava & Kang, P.C.

(57) ABSTRACT

An apparatus for providing multicore fiber (OCF) optical switching is disclosed. The apparatus may include an input fiber to receive an optical signal from an optical source. The apparatus may also include an output fiber to receive the optical signal from the input fiber. The apparatus may further include an optical switch element to provide optical switching between the input fiber and the output fiber. In some examples, at least one of the input fiber and the output fiber may be a multicore fiber (MCF), and the optical switching may be performed between at least one core of the input (Continued)

fiber and the output fiber. In some examples, the optical switch element may provide optical switching using a multicore fiber (MCF) optical switching technique, such as a lens offset technique, a rotation-based technique, a tip-tilt technique, or an orientable optical element technique.

17 Claims, 10 Drawing Sheets

(56) References Cited

U.S. PATENT DOCUMENTS

| | | | |
|---|---|---|---|
| 7,095,915 B2* | 8/2006 | Dames | G02B 6/32 385/16 |
| 2002/0006247 A1* | 1/2002 | Vaganov | G02B 6/3502 385/17 |
| 2003/0081887 A1* | 5/2003 | Karpinsky | G02B 6/3524 385/22 |
| 2006/0018591 A1* | 1/2006 | Ghandi | H04Q 11/0005 385/16 |
| 2012/0328238 A1* | 12/2012 | Inoue | G02B 6/29311 385/16 |
| 2016/0062036 A1* | 3/2016 | Mori | G02B 6/02042 250/492.1 |
| 2020/0284988 A1* | 9/2020 | Tanaka | G02B 6/3556 |

OTHER PUBLICATIONS

J. Ford et al. 1×N fiber bundle scanning switch. IEEE Photonics Technology Letters, 10:7:967-969, Jul. 1998. (Year: 1998).*

Callum Deakin et al., "Design and Analysis of Beam Steering Multicore Fiber Optical Switches", Journal of Lightwave Technology ( vol. 37, Issue: 9, May 11, 2019), 1954-1963, (10 pages).

* cited by examiner

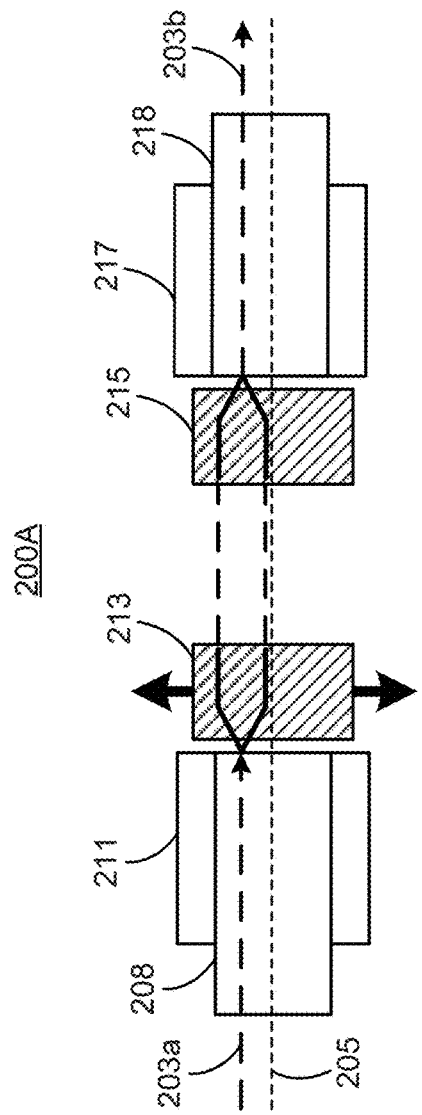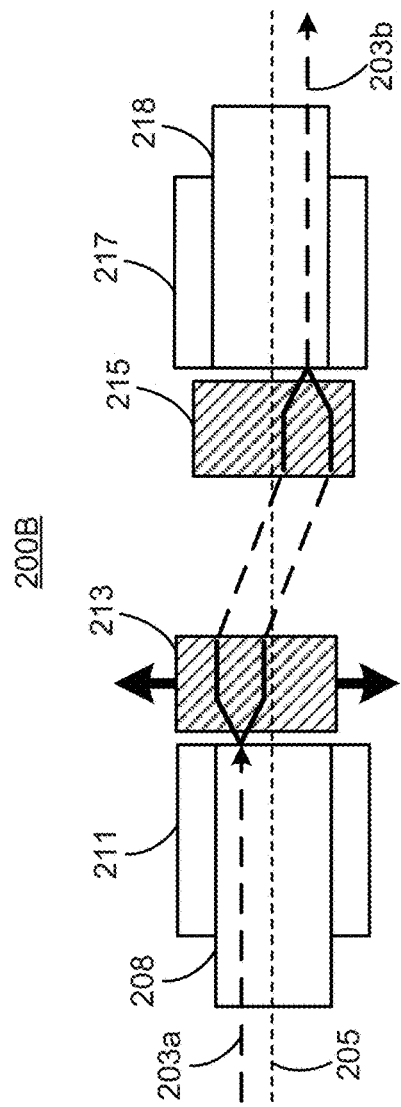

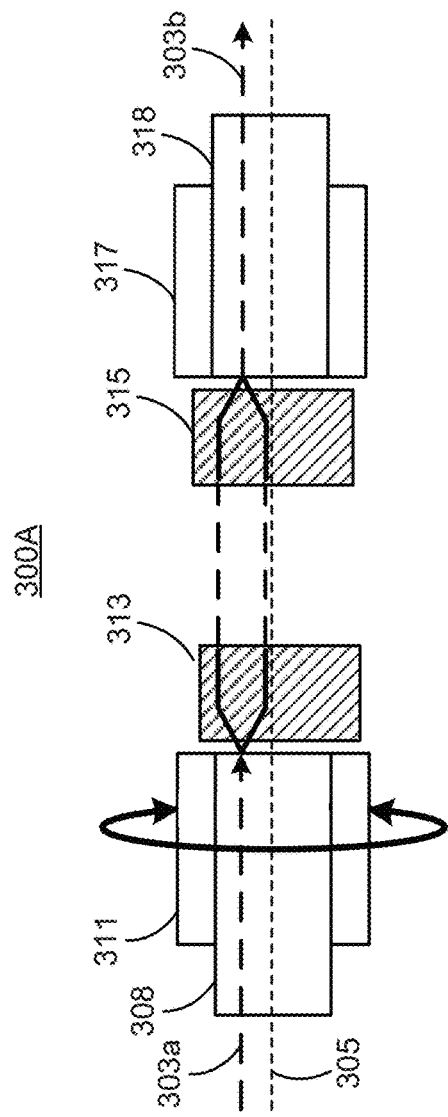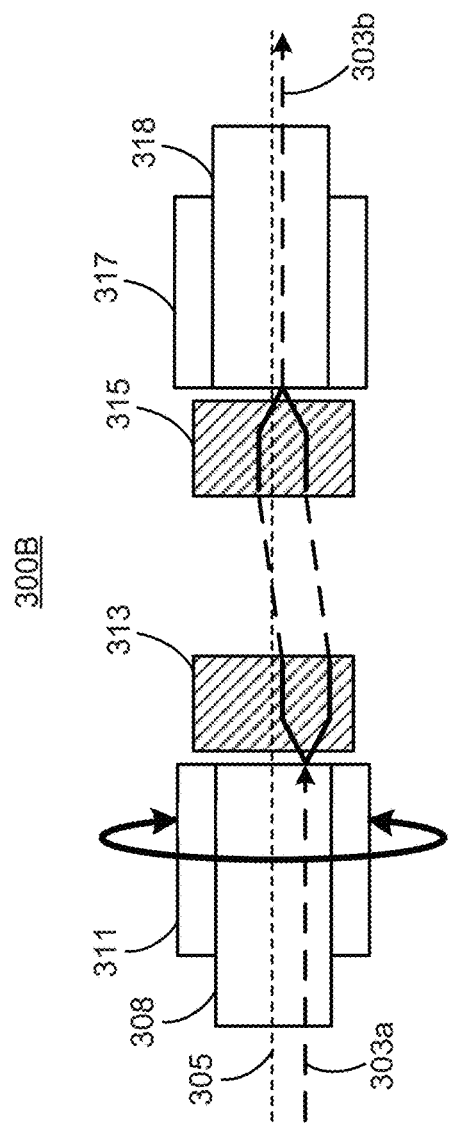

FIBER-OPTIC SWITCHES USING MULTICORE OPTICAL FIBERS

TECHNICAL FIELD

This patent application is directed to optical elements and instrumentation for network and measurement equipment in telecommunication networks, and more specifically, to fiber-optic switches using multicore fibers (MCF).

BACKGROUND

Fiber-optic switches may be found in various fiber-optic transport-layer network and measurement equipment. An optical switch, for example, may route an optical signal from one input fiber to any of number (N) of output fibers. Such a switch may be referred to a 1×N switch. There may be other various types and/or topologies of switches, such as 2×N or even M×N cross-connect switches. Regardless of the specific port connectivity offered, the optical switch may be used to route an optical signal from the input fiber(s) to one of the output fiber(s).

A fiber-optic switch may be an essential network element for provisioning network service, establishing network connectivity, and various test and measurement protocols and processes. However, as network and communications systems require higher reliability and scalability to service an ever-increasing consumer demand, conventional optical switches fail to provide an adequate solution to keep up. For example, a fiber-optic switch with a high port count (using a high number of single mode fibers) may be quite large and bulky, and may be highly expensive to construct. Furthermore, as the number of single mode fibers increase, handling a fiber-optic switch becomes more complex because there are more moving parts and many more points of potential failure or error, thereby reducing its operability and reliability in any network or communication system.

BRIEF DESCRIPTION OF DRAWINGS

Features of the present disclosure are illustrated by way of example and not limited in the following Figure(s), in which like numerals indicate like elements, in which:

FIGS. 2A-2C illustrate a fiber-optic element using a multicore fiber (MCF) for optical switching based on a lens offset technique, according to an example;

FIGS. 3A-3C illustrate a fiber-optic element using a multicore fiber (MCF) for optical switching based on a fiber rotation-based technique, according to an example;

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, fiber-optic switches may be essential to provisioning network service, establishing network connectivity, and various test and measurement protocols and processes. However, network and communications systems are increasing in size and complexity in order to service an ever-increasing consumer demand. Conventional network elements using optical switches fail to provide an adequate solution to keep up with increasing demands.

For example, a fiber-optic switch with a high port count may be physically large and bulky. There reason for this is because larger network and communications systems may require a great number of port counts, which in turn may require the use a great number of single mode (SM) fibers. Each single mode (SM) fiber may in turn use its own fiber tube assembly (FTA) and/or optical element, such as a lens, in order to provide one single optical channel. In order to have a large number of optical channels, conventional fiber-optic switches may therefore be necessarily bulky and complex.

Having more single mode (SM) fibers, fiber tube assembly (FTA), and lenses, not to mention other fiber bundling components (e.g., glass capillaries, silicon grooves, ferrules, housing, etc.) and actuation elements, conventional fiber-optic switches may be costly to construct. Moreover, having an increased number of moving parts may create additional points of potential failure or error. Lack of reliability may also result. Thus, conventional solutions for optical switching may be associated with bulkiness, costliness, complexity, and/or error-proneness that is unacceptable for current network and communications systems.

The apparatuses, systems, and methods described herein may provide reliable optical switching with a small form factor, simplicity, efficiency, and cost-effectiveness.

Figure 1:
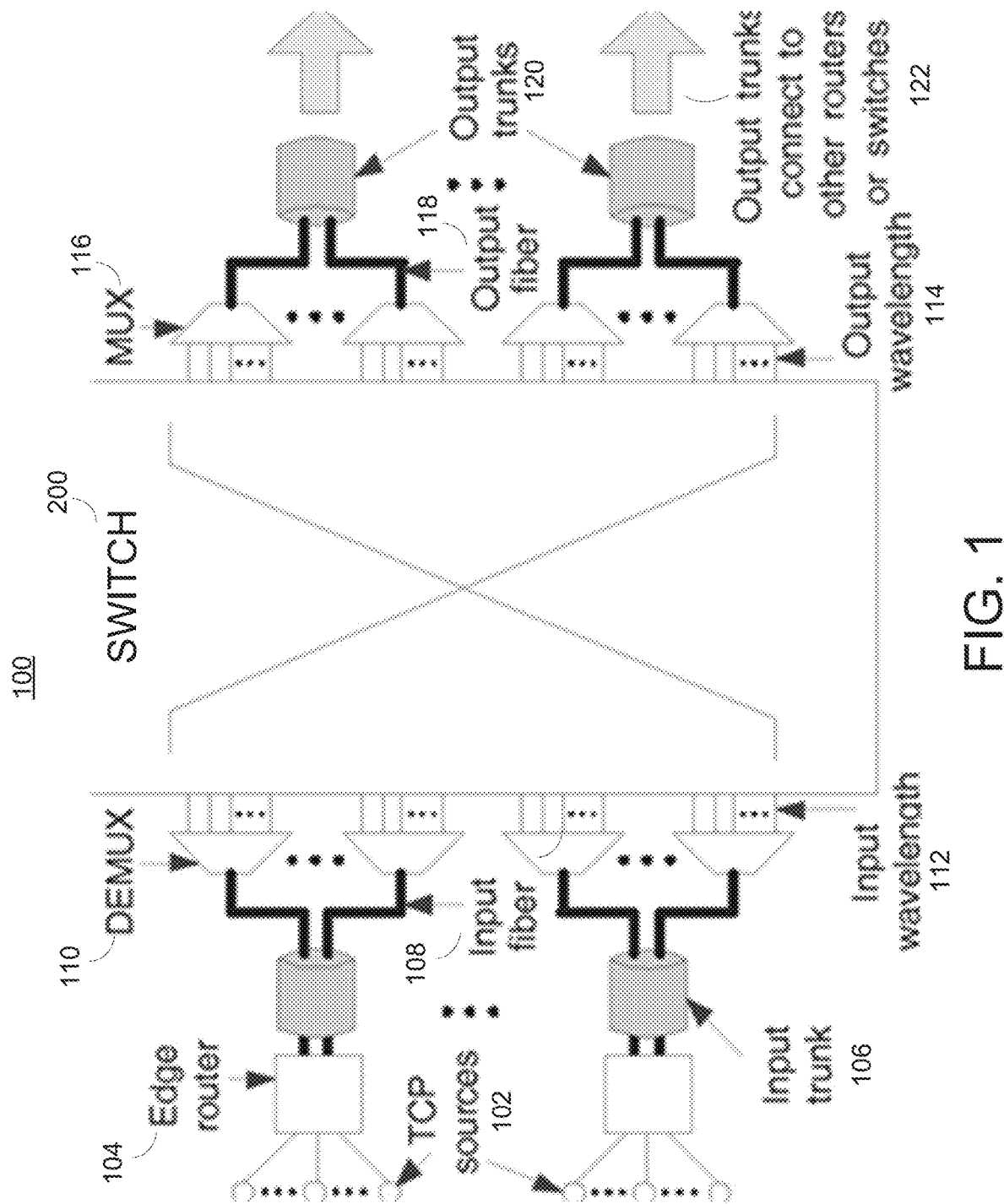
FIG. 1 illustrates an apparatus with a fiber-optic element using a multicore fiber (MCF) switch, according to an example.

FIG. 1 illustrates an apparatus 100 with a fiber-optic element 200 using a multicore fiber (MCF), according to an example. As shown, the apparatus 100 may include one or more TCP sources 102, one or more edge routers 104, one or more input trunks 106, each comprising any number (N) of input fibers 108. The input fibers of 108 may be communicatively coupled to one or more demultiplexers (DE-MUX) 110, which may transmit one or more optical signals, such as input wavelengths 112, to a switch 200, such as a core DWDM switch, which then transmits, the one or more optical signals, such as output wavelengths 114 to one or more multiplexers (MUX) 116. The optical signals may then traverse through one or more output fibers 118, supported by one or more output trunks 120, to any number of downstream optical elements (e.g., routers, switches, network components, etc.).

Optical switching may play an important role in optical network communication, test and measurement, and other similar systems. The apparatuses, systems, and methods described herein may provide accurate and reliable optical switching using multicore fiber (MCF) optical switching techniques in more compact, simple, efficient, and cost-effective ways.

Figure 2C:
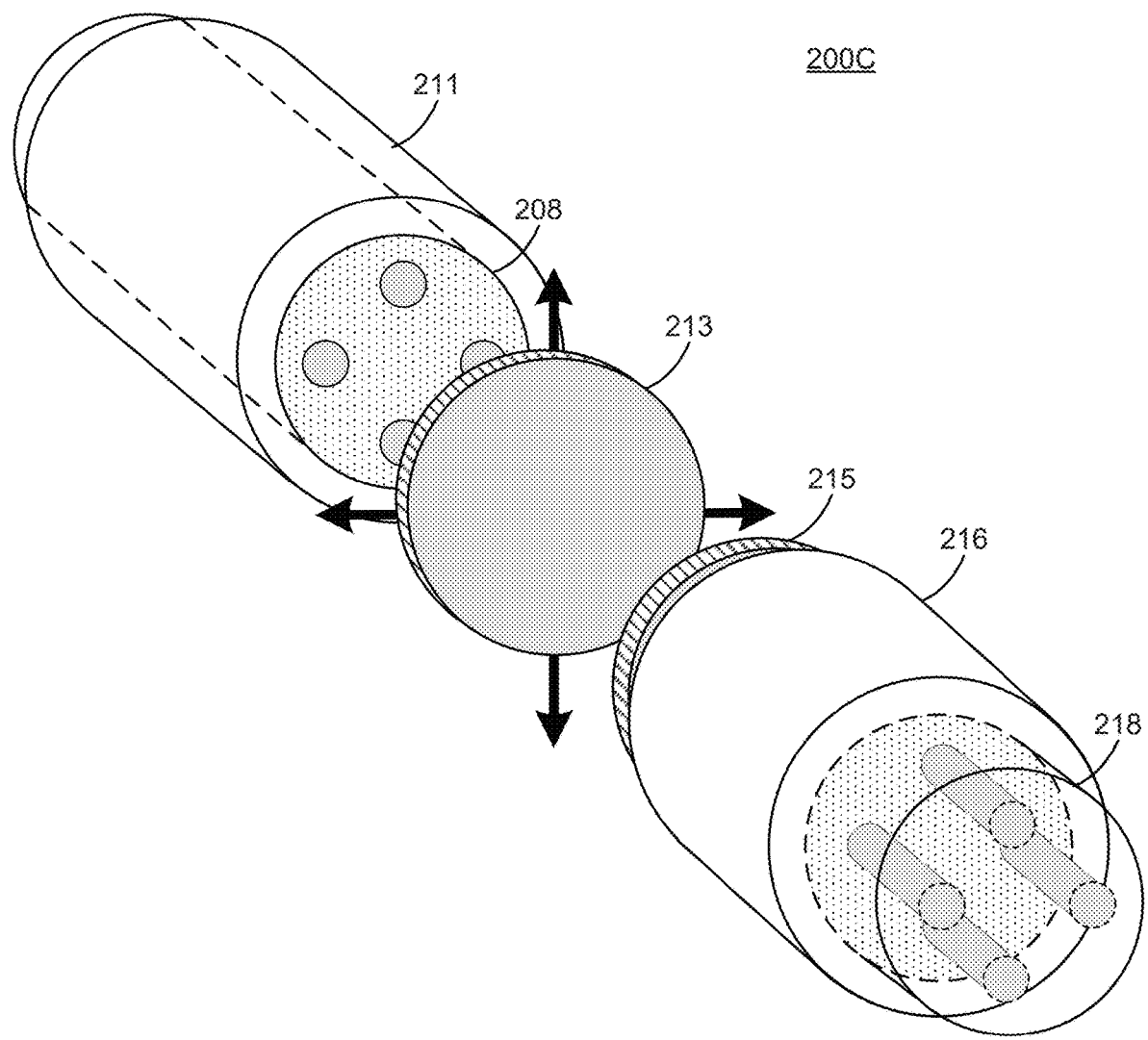

FIGS. 2A-2C illustrate views 200A-200C of a fiber-optic element 200 using a multicore fiber (MCF) for optical switching based on a lens offset technique, according to an example. FIGS. 2A-2B illustrate side views 200A-200B of a fiber-optic element 200 using a multicore fiber (MCF) for optical switching based on a lens offset technique, according to an example. As shown in FIG. 2A, the fiber-optic element 200 may be a fiber-optic switch, an optical switch, or any other element that performs a related switching feature, e.g., the lens offset technique. The fiber-optic element 200 may include an (input) optical signal 203a from an optical source (not shown) may be received at an input fiber 208 that is surrounded by an input fiber tube assembly (FTA) 211, which may be in alignment 205 with an output fiber 218 surrounded by an output fiber tube assembly (FTA) 217. The (input) optical signal 203a may traverse from the input fiber to an optical element 213, such as a lens, which may be moved (or offset) using an actuation element (not shown). Because the input fiber 208 and the output fiber 218 may be multicore fibers (MCFs) having multiple cores to transmit light, movement of the optical element 213, via minor movement, micropositioning, or offsetting, may route the optical signal 203a to different core of the output fiber 218 as an optical signal 203b, wherein this core is below the alignment 205, as shown in FIG. 2B. It should be appreciated that movement of the optical element 213 may parallel to the plane of the face of the input fiber 208, e.g., at least along a y-axis, as shown by darkened arrows of the optical element 213.

FIG. 2C illustrates a planar view 200C of a fiber-optic element 200 using a multicore fiber (MCF) for optical switching based on a lens offset technique, according to an example. As shown in FIG. 2C, the input fiber 208 and the output fiber 218 may each be a multicore fiber (MCF) having four (4) cores. Although FIG. 2C illustrates the input fiber 208 and the output fiber 218 as multicore fibers (MCFs) having the same number of cores, it should be appreciated that optical switching using the lens offset technique, as described herein, may be provided with only one of the input fiber 208 or the output fiber 218 being a multicore fiber (MCF). In the event both the input fiber 208 and the output fiber 218 are multicore fibers (MCFs), they may be provided with a different or a same number of cores. The size, type, and variety of multicore fiber (MCF) used for the input fiber 208 and/or the output fiber 218 will be described in further detail with respect to FIGS. 6A-6H.

It should also be appreciated that movement of the optical element 213 may be in along a plane (x-axis and y-axis), as shown by darkened arrows of the optical element 213. Such movement may be caused by an actuation element (not shown). These may include, but not limited to, an actuation element that includes a piezo, stepper motor, voice coil, squiggle motor, servo motor, galvanometer, or other electro-mechanical technique.

Although the examples above portray the optical element 215, which may also be a lens or other collimator, in a relatively fixed position, it should be appreciated that the optical element 215 may also be moved, positioned, or offset in a same or similar way that optical element 213 is moved, positioned, or offset, as described, to provide optical switching as part of the lens offset technique.

Figure 3C:
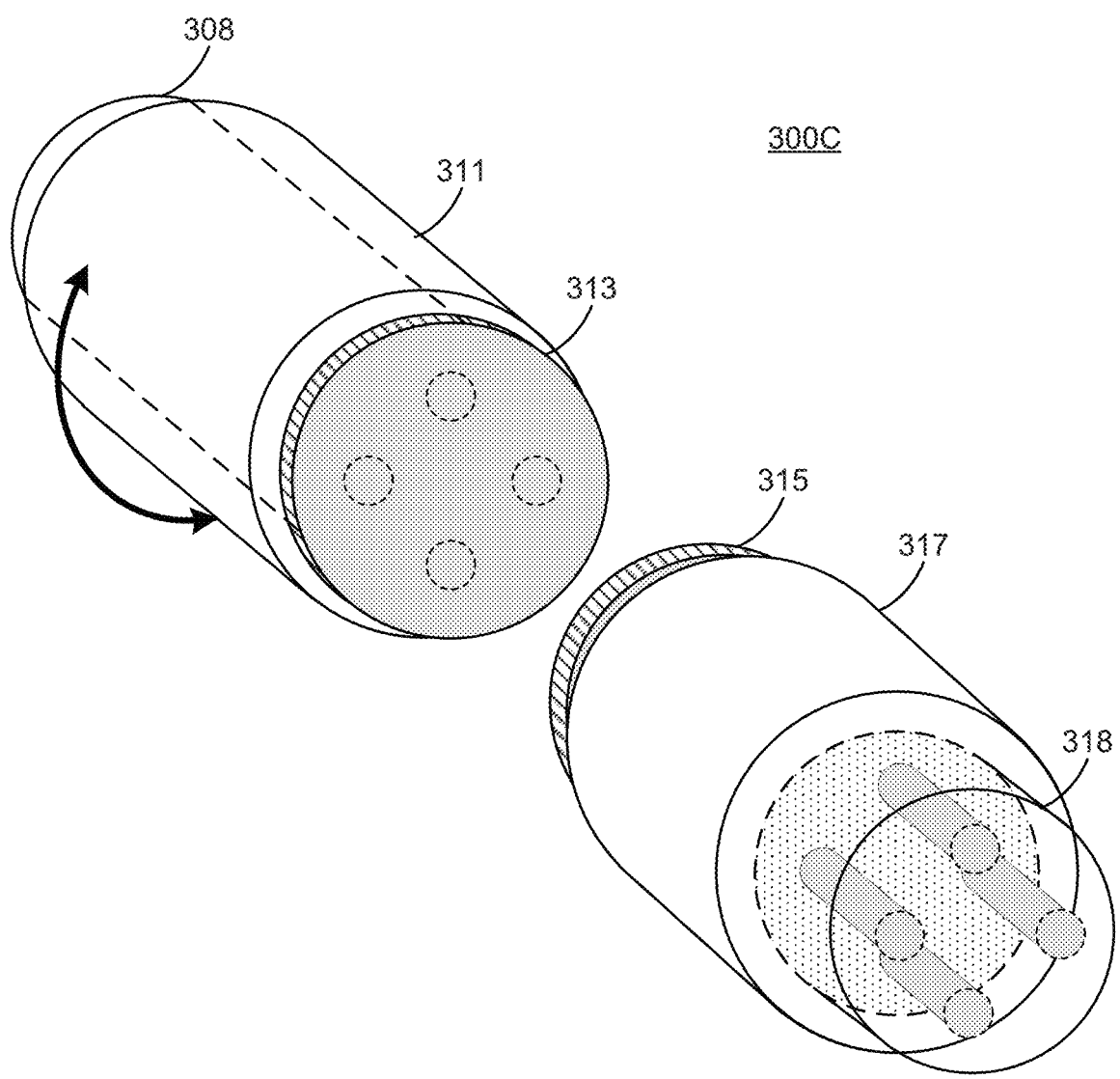

FIGS. 3A-3C illustrate views 200A-300C of a fiber-optic element 300 using a multicore fiber (MCF) for optical switching based on a fiber rotation-based technique, according to an example. FIGS. 3A-3C illustrate side views 300A-300C of a fiber-optic element 300 using a multicore fiber (MCF) for optical switching based on a fiber rotation-based technique, according to an example. As shown in FIG. 3A, the fiber-optic element 300 may be a fiber-optic switch, an optical switch, or any other element that performs a related switching feature, e.g., the fiber rotation-based technique. The fiber-optic element 300 is similar to that of fiber-topics element 200 of FIGS. 2A-2C. For example, the fiber-optic element 300 may include an (input) optical signal 303a from an optical source (not shown) may be received at an input fiber 308 that is surrounded by an input fiber tube assembly (FTA) 311, which may be in alignment 305 with an output fiber 318 surrounded by an output fiber tube assembly (FTA) 317. The (input) optical signal 303a may traverse from the input fiber to an optical element 313, such as a lens, which may be in a fixed position relative to the input fiber 308. Because the input fiber 208 and the output fiber 218 may be multicore fibers (MCFs) having multiple cores to transmit light, rotational movement (as shown by black arrows) of the input fiber tube assembly (FTA) 311 and the input fiber 308 may route the optical signal 203a to different core of the output fiber 318 as an optical signal 303b, wherein this core is below the alignment 205, as shown in FIG. 3B.

FIG. 3C illustrates a planar view 300C of a fiber-optic element 300 using a multicore fiber (MCF) for optical switching based on a lens offset technique, according to an example. As shown in FIG. 3C, the input fiber 308 and the output fiber 318 may each be a multicore fiber (MCF) having four (4) cores. Like the description above with respect to FIG. 2C, although FIG. 3C illustrates the input fiber 308 and the output fiber 318 as multicore fibers (MCFs) having the same number of cores, it should be appreciated that optical switching using the rotation-based technique, as described herein, may be provided with only one of the input fiber 308 or the output fiber 318 being a multicore fiber (MCF). In the event both the input fiber 308 and the output fiber 318 are multicore fibers (MCFs), they may be provided with a different or a same number of cores. Again, the size, type, and variety of multicore fiber (MCF) used for the input fiber 308 and/or the output fiber 318 will be described in further detail with respect to FIGS. 6A-6H.

The rotational movement of the input fiber 308 and the input fiber tube assembly (FTA) 311 may be caused by an actuation element (not shown), similar to that as described with respect to FIGS. 2A-2C. These may include, but not limited to, an actuation element that includes a piezo, stepper motor, voice coil, squiggle motor, servo motor, galvanometer, or other electro-mechanical technique. Because the rotation-based technique described in FIGS. 3A-3C include rotating the input fiber 308 and the fiber tube assembly (FTA) 311, an actuation element that provides rotation movement may be provided, such as stepper motor or other electro-mechanical actuator mechanism.

Although the examples above portray the rotation movement of the input fiber 308 and the input fiber tube assembly (FTA) 311, it should be appreciated that the output fiber 318 and the output fiber tube assembly (FTA) 317 may also be subject to rotational movement in a same or similar way that input fiber 308 and the fiber tube assembly (FTA) 311 is moved to provide optical switching as part of the rotation-based technique.

It should be appreciated that rotational movement of the input fiber 308 and/or the output fiber 318 may necessarily cause some strain on the fibers. However, if the rotational movement is less than 180 degrees or 90 degrees (or other predetermined threshold), this strain (and its effects) on the performance of the fibers) may be inconsequential or negligible on the optical performance of the fiber(s).

Figure 4:
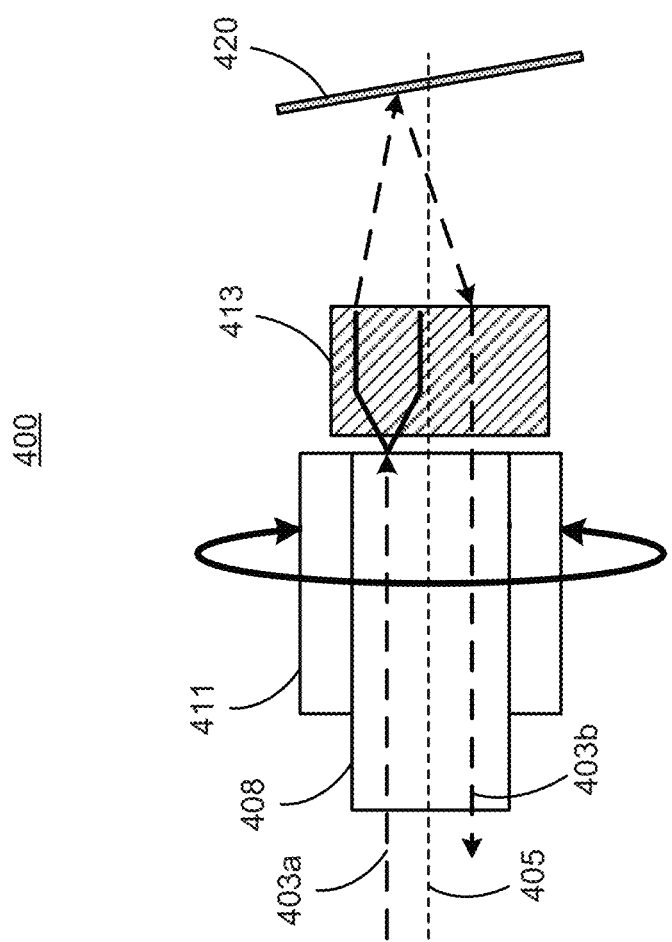
FIG. 4 illustrates a fiber-optic element using a multicore fiber (MCF) for optical switching based on a tip-tilt mirror technique, according to an example.

FIG. 4 illustrates a side view of a fiber-optic element 400 using a multicore fiber (MCF) for optical switching based on a tip-tilt mirror technique, according to an example. The fiber-optic element 400 is similar to that of fiber-topics element 200 of FIGS. 2A-2C and fiber-optic element 300 of FIGS. 3A-3C. For example, the fiber-optic element 400 may include an (input) optical signal 403a from an optical source (not shown) may be received at an input fiber 408 that is surrounded by a fiber tube assembly (FTA) 411. The fiber-optic element 400 may also include an optical element 413 that allows transmission of the optical signal 403.

However, in this configuration, the fiber-optic element 400 may not include any separate and distinct output components like those shown in FIGS. 2A-2C and FIGS. 3A-3C. Instead, the fiber-optic element 400 may include a mirror 420, such as a MEMS mirror. This mirror 420 may reflect the optical signal 403a back to the optical element 411 and to a different core of the input fiber 408, as shown, below alignment 405. Although this different core is in the same input fiber 408, it may function as an output core to transmit an optical signal 403b to any number of downstream elements. The tip-tilt technique may involve moving the mirror 420 in any number of ways (such as tilting, tipping, etc.) using an actuation element (not shown) similar to those described above for FIGS. 2A-2C and FIGS. 3A-3C.

Figure 5A:
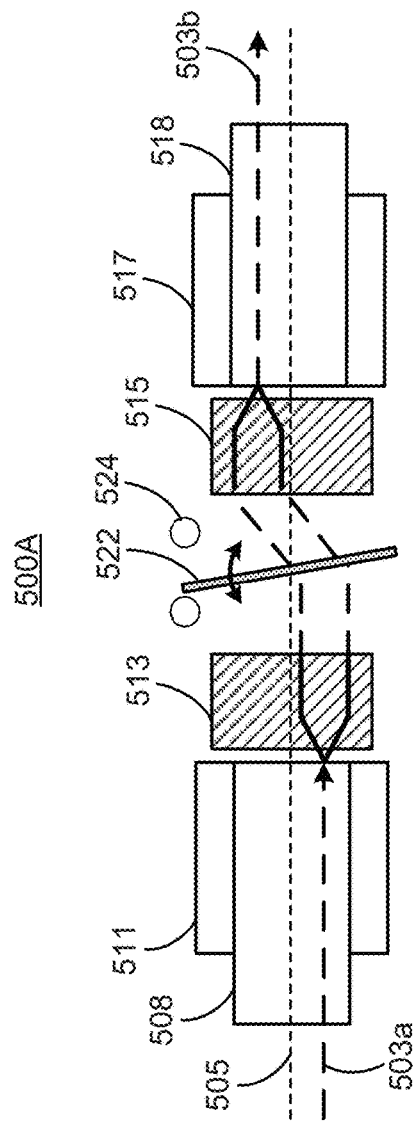
FIGS. 5A-5B illustrate a fiber-optic element using a multicore fiber (MCF) for optical switching based on an orientable optical element technique, according to an example.
Figure 5B:
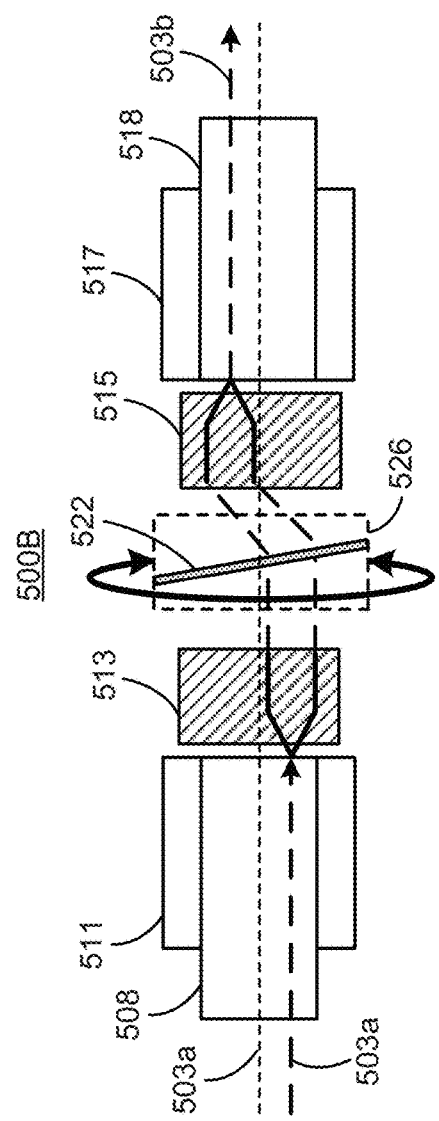
Figure 6A:
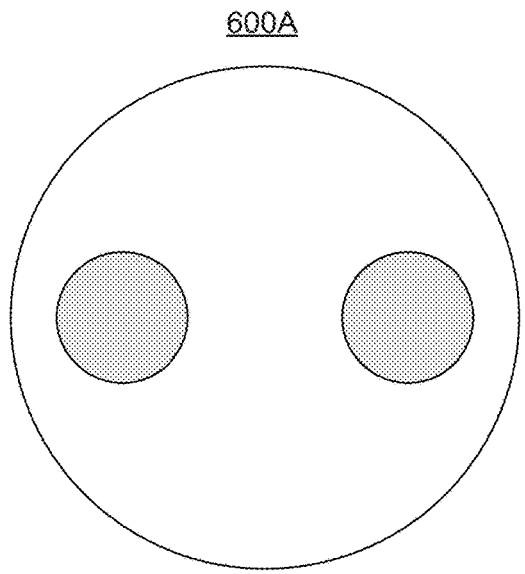
FIGS. 6A-6H illustrate various multicore fiber (MCF) configurations for optical switching in an apparatus with fiber-optic element for optical switching, according to an example.
Figure 6B:
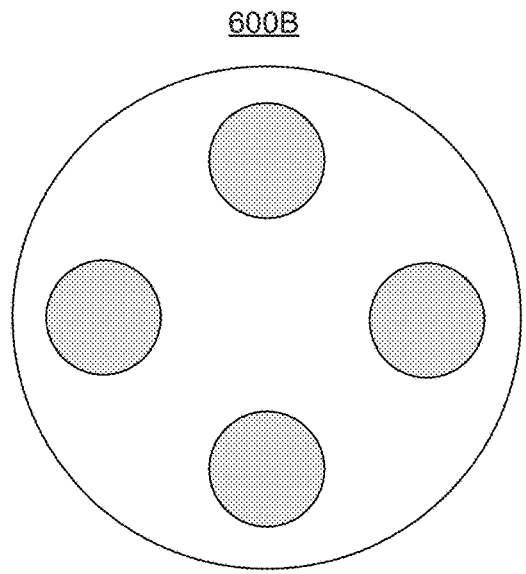
Figure 6C:
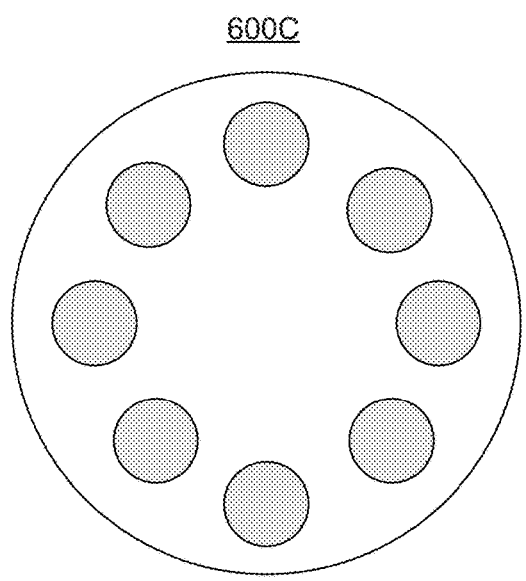
Figure 6D:
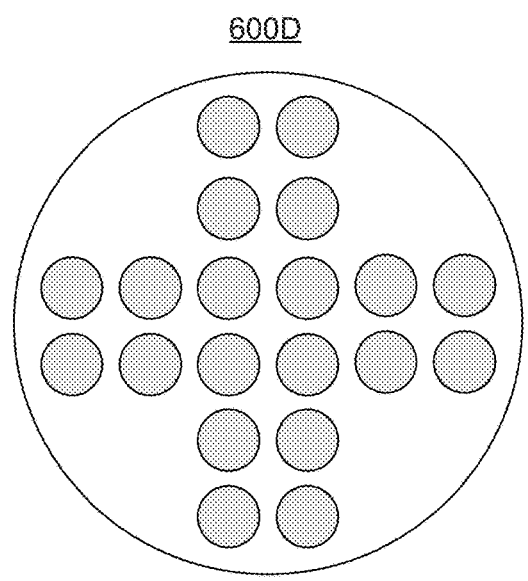
Figure 6E:
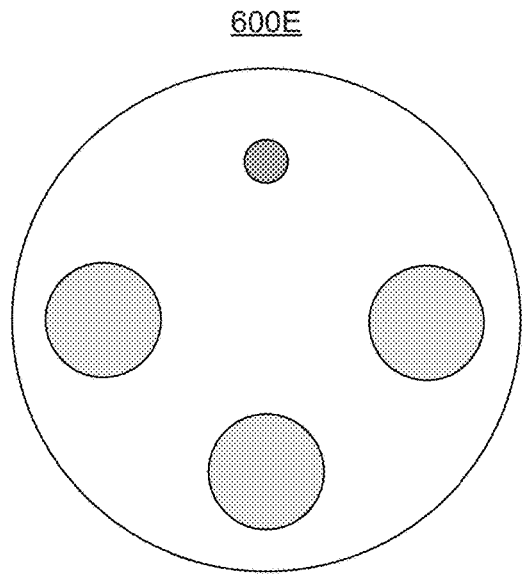
Figure 6F:
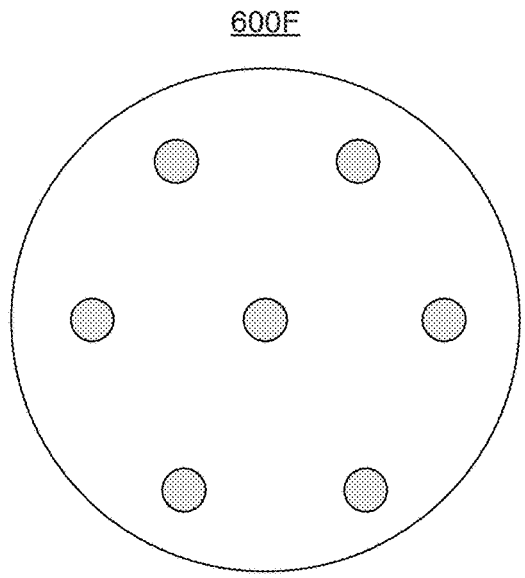
Figure 6G:
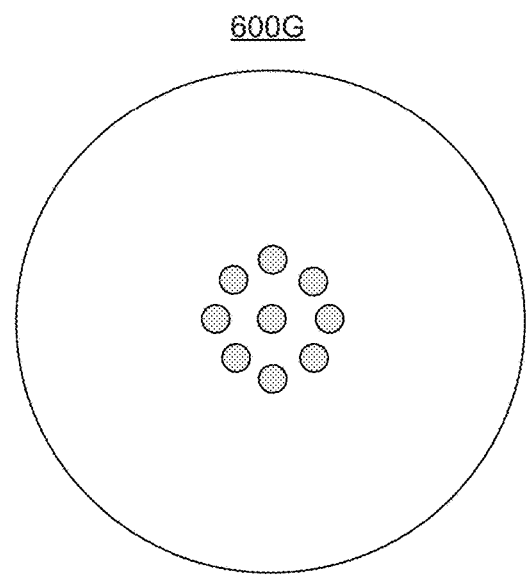
Figure 6H:
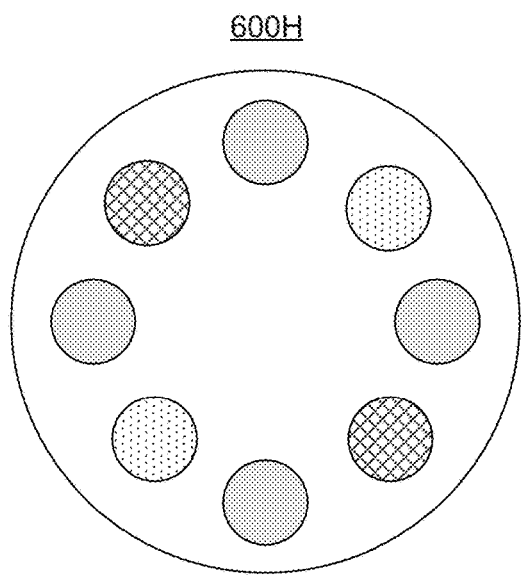

FIGS. 5A-5B illustrate side views 500A-500B of a fiber-optic element 500 using a multicore fiber (MCF) for optical switching based on an orientable optical element technique, according to an example. The fiber-optic element 500 is similar to that of fiber-optic element 200 of FIGS. 2A-2C and fiber-optic element 300 of FIGS. 3A-3C. For example, the fiber-optic element 500 may include an (input) optical signal 503a from an optical source (not shown) may be received at an input fiber 508 that is surrounded by a fiber tube assembly (FTA) 511. The fiber-optic element 500 may also include an optical element 513 that allows transmission of the optical signal 503a, However, rather than rely on movement of the optical element 513 (e.g., lens offset technique) or rotating the input fiber 508 (e.g., rotation-based technique), the fiber-optic element 500 may include an orientable optical element 522 to alter or route the optical signal 503a to output components, such as an optical element 513, an output fiber tube assembly (FTA) 517, output fiber 518. As shown in FIG. 5A, the optical signal 503a may be transmitted as optical signal 503b, above alignment 505. The fiber-optic element 500 shown in FIG. 5A may also include one or more positional bumpers (e.g., travel-limiting or movement-limiting hard stops) 524 to limit out-of-range movement of the orientable optical element 522, which may include any refractive element, such as glass or other similar material. The orientable optical element 522 may also be provided in any number of shapes or dimensions. For example, the orientable optical element 522 may be a flat, wedge-shaped, or comprised of different index of refractions.

As shown in FIG. 5B, the fiber-optic element 500 includes all the same elements as shown in FIG. 5A. However, the fiber-optic element 500 may not use any positional bumpers 524. Rather, the orientable optical element 522 of the fiber-optic element 500 of FIG. 5A may be fixed in a structure 526, such as a cylindrical tube, which may be rotated or moved using an actuation element (not shown). It should be appreciated that the cylindrical tube configuration may also be applied to examples described above with respect to views 300A and 300B of FIGS. 3A-3B or other relevant examples described herein.

However, in this configuration, the fiber-optic element 400 may not include any separate and distinct output components like those shown in FIGS. 2A-2C and FIGS. 3A-3C. Instead, the fiber-optic element 400 may include a mirror 420, such as a MEMS 1D-tilt, 2-D tip-tilt, distortable membrane-type MEMS reflector, or other reflective element. This mirror 420 may reflect the optical signal 403a back to the optical element 411 and to a different core of the input fiber 408, as shown, below alignment 405. Although this different core is in the same input fiber 408, it may function as an output core to transmit an optical signal 403b to any number of downstream elements. The tip-tilt technique may involve moving the mirror 420 in any number of ways (such as tilting, tipping, deflecting, distorting, etc.) using an actuation element (not shown) similar to those described above for FIGS. 2A-2C and FIGS. 3A-3C.

An advantage of the examples for optical switching described herein not only includes the utilization of multi-core fibers (MCF), but the actuation element (not shown) for moving, positioning, twisting, rotating, or otherwise routing/switching the optical signal may involve relatively small increments. In other words, the actuation element may not require large motors or components that are bulky and expensive. Rather, the actuation element (not shown) for the examples described herein may rely on smaller and precise movements, which can be controlled using any number of actuation techniques.

Some examples of actuation techniques to be implemented in the apparatuses, systems, and methods may be described herein. The first may be a calibration technique. The calibration technique, for example, may involve a voltage-controlled memory system that uses individually calibrated and stored positions. These positions may be preprogramed and stored, for instance, in a lookup table or other storage. So taking the lens offset technique examples of FIGS. 2A-2C described above, the calibration technique would identify the type of input/output fibers 208 (including brand, number of cores, refractive/reflective properties, etc.) and 218 and type of optical elements 213 and 215, identify potential switching options, receive instructions on what type of switching/routing to perform, look up a position or action (move, rotate, tip/tilt) that corresponds with the instructions for switching/routing, and transmitting instructions to the actuation element to perform a movement that corresponds with the position or action. In the lens offset technique, this may involve moving the optical element 211 by a specific increment to achieve the optical switching action, as shown in FIG. 2B.

The second actuation technique may be a feedback technique. The feedback technique may involve a tap at an output tap location. This tap may allow measurement of optical output power (at the designated or intended output fiber/core) to compare with optical input power. If the optical output power of similar or comparable to the optical input power, then it may be determined that there is proper switching/routing alignment. If the optical output power is less than the optical input power, by any degree or measure, it may be determined that additional actuation (movement, rotation, tilting/tipping) may be required. It should be appreciated that the feedback technique may perform these functions in real-time or near real-time. It should also be appreciated that the calibration technique may be used in combination with the feedback technique, or vice versa, or with any other number of actuation techniques to provide improved or precise micro-actuation. Other factors used in selecting and implementing a particular actuation element may include cost, ease of use/control, type of motion, size, accuracy, reliability, durability, speed/efficiency, etc. The examples described herein may provide at least several of these advantages for optical switching using multicore fibers (MCFs).

It should also be appreciated that the optical element described herein, such as optical elements 213 and 215 of FIGS. 2A-2C, optical elements 313 and 315 of FIGS. 2A-2C, optical element 413 of FIG. 4, and optical elements 513 and 515 of FIGS. 5A-5B may include, but not limited to, any number of different types of lens or similar optical element. In some examples, the optical element may be a graded-index lens or gradient-index (GRIN) lens. Other various refractive elements may also be provided. For example, these may include, but not limited to, microlenses, micro-lens arrays, traditional bulk-lenses, or other refractive/diffractive optical elements.

FIGS. 6A-6H illustrate various cross-sectional views of multicore fiber (MCF) configurations 600A-600H for optical switching in an apparatus with fiber-optic element for optical switching, according to an example. As shown, there may be any number of multicore fiber (MCF) configurations 600A-600H that may be used. In some examples, the cores of the multicore fibers (MCFs) may generally be decoupled cores. In some examples, there may be any number of cores in each multicore fiber (MCF). For instance, the range of cores in each multicore fiber (MCF) may be two (2) to thirty-two (32), with a typical core numbers being 2, 4, 6, 7, 8, 12, 19, 20, and 32, some of which are shown in FIGS. 6A-6H.

Arrangement of cores in a multicore fiber (MCF) may also vary. Any number of combinations may be provided. The cores may be tightly packed (see FIG. 6F) or loosely spaced apart (see FIGS. 6D and 6G). The cores may or may not exhibit some form symmetry, such as circular symmetry or other pattern, as shown in many of the multicore fiber (MCF) configurations. The cores may also come in a variety of sizes and dimensions, and each multicore fiber (MCF) itself may come in a variety of sizes and dimensions as well. For example, a typical multicore fiber (MCF) may have a diameter of 125 p (microns), but other various sizes and dimensions, smaller or greater, may also be provided.

It should be appreciated that hybrid multicore fibers (MCFs) may also be provided. As shown in multicore fiber (MCF) configuration 600E, there may be three (3) multi-mode cores and one (1) single-mode core in a singular fiber. As shown in multicore fiber (MCF) configuration 600H, each core of the multicore fiber (MCF) may be a different type of core, as shown. In other words, the multicore fiber (MCF) may be homogeneous or heterogeneous, hybrid, or other various. It should be appreciated that "homogenous" may refer to cores of all the same or similar type and "heterogeneous" may refer to cores of at least two different types. Although examples described herein are directed to use of at least one multicore fiber (MCF), e.g., in an input or an output, it should be appreciated that single-mode fibers (SMFs) may also be used as well.

In some examples, for single-mode switch applications, a single-mode fiber (SMF) and multicore fiber (MCF) homogenous type of fiber(s) may be used. In some examples, for multi-mode switch applications, a multi-mode fiber (MMF) and multicore fiber (MCF) homogenous type of fiber(s) may be used. Other various combinations using hybrid or coupled-type fibers may also be provided in some applications and uses.

While examples described herein are directed to configurations as shown, it should be appreciated that any of the components described herein may be altered, changed, replaced, or modified, in size, shape, and numbers, or material, depending on application or use case, and adjusted for desired optical switching or other optical applications and implementations.

Figure 7:
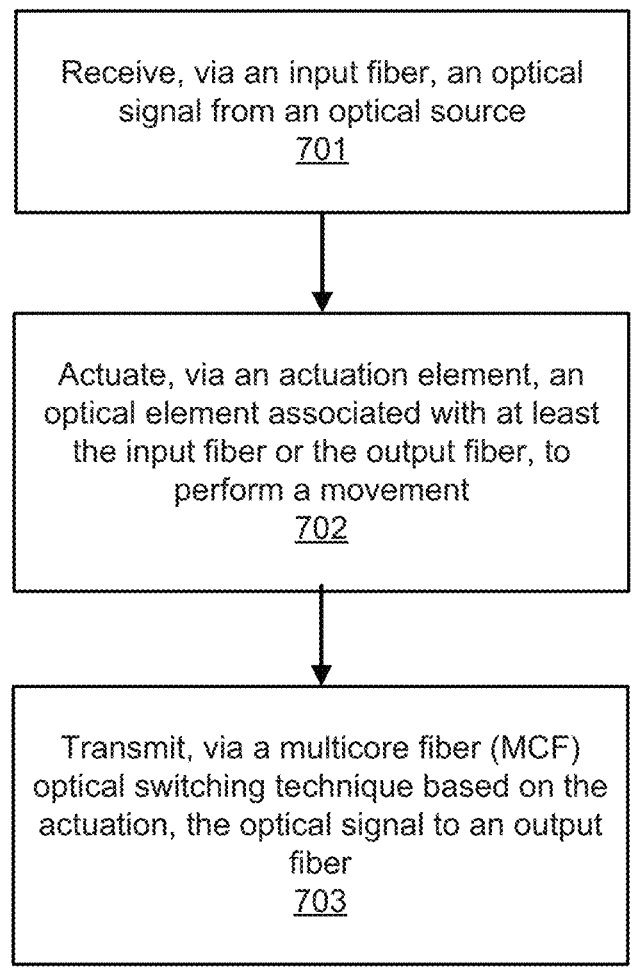
FIG. 7 illustrates a flow chart of optical switching using an apparatus with a fiber-optic element using a multicore fiber (MCF), according to an example.

FIG. 7 illustrates a flow chart 700 of optical switching using a multicore fiber (MCF), according to an example. The method 700 is provided by way of example, as there may be a variety of ways to carry out the method described herein. Although the method 700 is primarily described as being performed by the systems and apparatuses described herein, the method 700 may be executed or otherwise performed by one or more processing components of another system or a combination of systems. Each block shown in FIG. 7 may further represent one or more processes, methods, or subroutines, and one or more of the blocks may include machine readable instructions stored on a non-transitory computer readable medium and executed by a processor or other type of processing circuit to perform one or more operations described herein.

At block 701, an input fiber may receive an optical signal from an optical source. In some examples, the input fiber may be a multicore fiber (MCF) and the optical source may be a tunable laser or any other optical light source to generate and transmit an optical signal. In some examples, the input fiber comprises an input fiber tube assembly and an input optical element.

At block 702, an actuation element may actuate an optical element associated with at least the input fiber or the output fiber to perform a movement on the optical element. This movement may result in optical switching in the optical signal. In some examples, this optical switching may also be referred to as a multicore fiber (MCF) optical switching technique since at least one of the input fiber and the output fiber may be a multicore fiber (MCF) and the optical switching may be performed between at least one core of the input fiber and the output fiber.

As described above with regards to FIGS. 2A-2C, for the lens offset technique, the actuation element (not shown) may move the optical element 213 in such a way (e.g., in a plane of an end face of the input fiber or the output fiber for the lens offset technique) to provide optical switching.

As described above with regards to FIGS. 3A-3C, for the rotation based technique, the actuation element (not shown) may rotate the input fiber 308 and/or the output fiber 318, which may therefore function as the "optical element" in such a way to provide optical switching from one core of a fiber to another core of a fiber.

As described above with regards to FIG. 4, for the tip-tilt technique, the actuation element (not shown) may move the optical element 413, which may be a mirror, in such a way to provide optical switching from one core of a fiber to another core of a fiber from one core of a fiber to another core of a fiber. In this example, the optical switching is performed from one core of the fiber to another core of the same fiber. In other words, the "output fiber" may be the same as the input fiber transmitting the optical signal.

As described above with regards to FIGS. 5A-5B, for the orientable optical element technique, the actuation element (not shown) may move the orientable optical element 522 in such a way to provide optical switching from one core of a fiber to another core of a fiber. As described above, the orientable optical element 522 using bumpers (e.g., travel-limiting or movement-limiting hard stops) 524 as guides, or another apparatus (e.g., cylinder or other holder) to perform the movements of optical switching.

As described herein, the actuation element may perform the movement based on a calibration technique, a feedback technique, or a combination thereof. Other actuation techniques may also be provided.

At block 703, the optical signal may be outputted or transmitted, via the multicore fiber (MCF) optical switching technique to an output fiber based on the movement from the actuation element from one core of a fiber to another core of a fiber. In some examples, the output fiber may also include an output fiber tube assembly and an output optical element.

As described herein, the multicore fiber (MCF) may include at least two cores that are decoupled. In some examples, the multicore fiber (MCF) may include at least two cores that arranged in a symmetrical configuration. In some examples, the multicore fiber (MCF) may be a homogeneous fiber, a heterogeneous fiber, a hybrid fiber, or some other type or combination of fiber.

It should be appreciated that the systems and methods described herein may facilitate multicore fiber (MCF) optical switching. It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to multicore fiber (MCF) optical switching, for example, may also be performed partially or in full by other various components of the overall system or apparatus.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system. For example, the actuation techniques described herein may utilize these storage capabilities to perform precise, repeatable, and accurate actuation micropositioning and movements for multicore fiber (MCF) optical switching.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to optical switches, it should be appreciated that the systems and methods described herein may also be used in other various systems and other implementations. For example, there may be numerous applications in optical communication networks, test and measurement systems, and fiber sensor systems that could employ the systems, apparatuses, and methods as well.

It should be appreciated that the systems and methods described herein may also be used to help provide, directly or indirectly, measurements for distance, angle, rotation, speed, position, wavelength, transmissivity, and other related optical measurements. For example, multicore fiber (MCF) optical switching may facilitate accurate test measurements of any number of device under test (DUT). It should also be appreciated that the systems and methods described herein may be configurable to any desired function or application, especially given the various types of optical switching techniques described herein.

With additional advantages that include reduced cost, increased simplicity, smaller form factor, and efficient movement or actuation, the systems and methods described herein may be beneficial in many original equipment manufacturer (OEM) applications, where they may be readily integrated into various and existing network equipment, fiber sensor systems, test and measurement instruments, or other systems and methods. The systems and methods described herein may provide mechanical simplicity and adaptability. Ultimately, the systems and methods described herein may provide improved optical switching, which may be important in any number of network test and measurement applications.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. An apparatus, comprising:
    an input fiber to receive an optical signal from an optical source;
    an output fiber to receive the optical signal from the input fiber; and
    an optical switch element that is actuated to perform a movement associated with a multicore fiber (MCF) optical switching technique to provide an optical switching between the input fiber and the output fiber,
    wherein at least one of the input fiber and the output fiber is a multicore fiber (MCF) and the optical switching is performed between at least one core of the input fiber and at least one core of the output fiber, wherein the multicore fiber (MCF) comprises at least two cores that are decoupled,
    wherein the multicore fiber (MCF) optical switching technique comprises at least one of a lens offset technique, a rotation-based technique, a tip-tilt technique, or an orientable optical element technique, and wherein the input fiber comprises an input fiber tube assembly and an input optical element, and the output fiber comprises an output fiber tube assembly and an output optical element.

2. The apparatus of claim 1, wherein the rotation-based technique comprises rotation of at least one of the input fiber or the output fiber.

3. The apparatus of claim 1, wherein the multicore fiber (MCF) comprises at least two cores that arranged in a symmetrical configuration.

4. The apparatus of claim 1, wherein the multicore fiber (MCF) is at least one of a homogeneous fiber, a heterogeneous fiber, or a hybrid fiber.

5. The apparatus of claim 1, further comprising an optical element in association with at least the input fiber or the output fiber.

6. The apparatus of claim 5, further comprising:
an actuation element to perform the movement of the optical element, wherein the movement is:
in a plane of an end face of the input fiber or the output fiber for the lens offset technique,
a tipping or tilting of the optical element for the tip-tilt technique, and
a rotation of the optical element for the orientable optical element technique.

7. The apparatus of claim 6, wherein the actuation element performs the movement based on at least one of a calibration technique or a feedback technique.

8. The apparatus of claim 7, wherein the output fiber is the same as the input fiber for the tip-tilt technique.

9. A method of performing multicore fiber (MCF) optical switching, comprising:
receiving, at an optical element via an input fiber, an optical signal from an optical source;
actuating the optical element to perform a movement associated with a multicore fiber (MCF) optical switching technique to provide an optical switching between the input fiber and an output fiber; and
transmitting, via the movement of the optical element, the optical signal to at least one core of the output fiber,
wherein at least one of the input fiber and the output fiber is a multicore fiber (MCF) and the optical switching is performed between at least one core of the input fiber and the output fiber, wherein the multicore fiber (MCF) comprises at least two cores that are decoupled and the multicore fiber (MCF) optical switching technique comprises at least one of a lens offset technique, a rotation-based technique, a tip-tilt technique, or an orientable optical element technique, and
wherein the input fiber comprises an input fiber tube assembly and an input optical element, and the output fiber comprises an output fiber tube assembly and an output optical element.

10. The method of claim 9, wherein the rotation-based technique comprises rotation of at least one of the input fiber or the output fiber.

11. The method of claim 9, wherein the multicore fiber (MCF) comprises at least two cores that arranged in a symmetrical configuration.

12. The method of claim 9, wherein the multicore fiber (MCF) is at least one of a homogeneous fiber, a heterogeneous fiber, or a hybrid fiber.

13. The method of claim 9, wherein the optical element is in association with at least the input fiber or the output fiber.

14. The method of claim 13, further comprising:
actuating, via an actuation element, the optical element to perform the movement, wherein the movement is:
in a plane of an end face of the input fiber or the output fiber for the lens offset technique,
a tipping or tilting of the optical element for the tip-tilt technique, and
a rotation of the optical element for the orientable optical element technique.

15. The method of claim 14, wherein the actuation element performs movement based on at least one of a calibration technique or a feedback technique.

16. The method of claim 14, wherein the output fiber is the same as the input fiber for the tip-tilt technique.

17. A non-transitory computer-readable storage medium storing instructions, which when executed, cause a processor to perform the following:
receiving, at an optical element, an optical signal from an input fiber;
actuating, using an actuation element, the optical element to perform a movement that is associated with a multicore fiber (MCF) optical switching technique; and
transmitting the optical signal to an output fiber based on the movement from the actuation element,
wherein:
at least one of the input fiber and the output fiber is a multicore fiber (MCF) comprising at least two cores that are decoupled,
the multicore fiber (MCF) optical switching is performed between at least one of the input fiber and the output fiber, and
the multicore fiber (MCF) optical switching technique comprises at least one of a lens offset technique, a rotation-based technique, a tip-tilt technique, or an orientable optical element technique, and
wherein the input fiber comprises an input fiber tube assembly and an input optical element, and the output fiber comprises an output fiber tube assembly and an output optical element.

* * * * *